(12) United States Patent
Wang et al.

(10) Patent No.: US 9,230,100 B2
(45) Date of Patent: Jan. 5, 2016

(54) SECURING ANTI-VIRUS SOFTWARE WITH VIRTUALIZATION

(71) Applicant: Microsoft Corporation, Redmond, WA (US)

(72) Inventors: Jiahe Helen Wang, Issaquah, WA (US); Jacob R. Lorch, Bellevue, WA (US); Bryan Jeffrey Parno, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 13/660,808

(22) Filed: Oct. 25, 2012

(65) Prior Publication Data
US 2013/0055396 A1    Feb. 28, 2013

Related U.S. Application Data

(63) Continuation of application No. 11/863,870, filed on Sep. 28, 2007, now Pat. No. 8,307,443.

(51) Int. Cl.
*G06F 11/00* (2006.01)
*G06F 21/53* (2013.01)

(52) U.S. Cl.
CPC .................................. *G06F 21/53* (2013.01)

(58) Field of Classification Search
CPC ...... H04L 63/1408; G06F 21/56; G06F 21/00
USPC ....................... 726/22–24; 713/188
See application file for complete search history.

(56) References Cited

U.S. PATENT DOCUMENTS

| | | | |
|---|---|---|---|
| 6,732,279 B2 | 5/2004 | Hoffman | |
| 6,873,988 B2 | 3/2005 | Herrmann et al. | |
| 6,892,241 B2 | 5/2005 | Kouznetsov et al. | |
| 7,395,436 B1 | 7/2008 | Nemovicher | |
| 8,234,640 B1 * | 7/2012 | Fitzgerald et al. | 718/1 |
| 8,307,443 B2 | 11/2012 | Wang et al. | |
| 2003/0145228 A1 | 7/2003 | Suuronen et al. | |
| 2003/0159070 A1 | 8/2003 | Mayer et al. | |
| 2006/0021032 A1 | 1/2006 | Challener et al. | |
| 2006/0031673 A1 | 2/2006 | Beck et al. | |
| 2006/0031937 A1 | 2/2006 | Steinberg | |

(Continued)

OTHER PUBLICATIONS

Antivirus Protection, Juniper Networks, Inc., http://www.juniper.net/products/integrated/antivirus.sub.--protection.pdf-, Jun. 2006, 4 Pages.
Anti-Virus, F5 Networks, Inc., http://www.f5.com/solutions/applications/pdfs/antivirus.sub.--ab.pdf., Oct. 2005, Last accessed on Jul. 18, 2007, 3 Pages.

(Continued)

*Primary Examiner* — Ali Abyaneh
(74) *Attorney, Agent, or Firm* — Alin Corie; Kate Drakos; Micky Minhas

(57) ABSTRACT

The subject disclosure relates to systems and methods that secure anti-virus software through virtualization. Anti-virus systems can be maintained separate from user applications and operating system through virtualization. The user applications and operating system run in a guest virtual machine while anti-virus systems are isolated in a secure virtual machine. The virtual machines are partially interdependent such that the anti-virus systems can monitor user applications and operating systems while the anti-virus systems remain free from possible malicious attack originating from a user environment. Further, the anti-virus system is secured against zero-day attacks so that detection and recovery may occur post zero-day.

20 Claims, 10 Drawing Sheets

(56) References Cited

U.S. PATENT DOCUMENTS

2006/0136720 A1\* 6/2006 Armstrong et al. ............ 713/164
2006/0136912 A1\* 6/2006 Robinson et al. ................. 718/1
2006/0185016 A1\* 8/2006 Sitze .............................. 726/24
2007/0094659 A1\* 4/2007 Singh et al. ........................ 718/1
2007/0180447 A1 8/2007 Mazzaferri et al.
2007/0234337 A1 10/2007 Suzuki et al.

OTHER PUBLICATIONS

F-Secure Anti-Virus for Microsoft Exchange, http://64.233.183.104/search?q=cache:AbtuAnpDqilJ:www.f-secure.com/export-/system/fsgalleries/datasheets/fsavmsex.pdf+securing+anti-virus+software2B-pdf&hl=en&ct=clnk&cd=17&gl=in, Jul. 19, 2007, 4 Pages.

\* cited by examiner

SECURING ANTI-VIRUS SOFTWARE WITH VIRTUALIZATION

CROSS REFERENCE TO RELATED APPLICATIONS

This application is a continuation of U.S. patent application Ser. No. 11/863,870, filed on Sep. 28, 2007, now U.S. Pat. No. 8,307,443, issued Nov. 6, 2012, which is incorporated herein by reference in its entirety.

BACKGROUND

The typical computer system depends on various forms of protection software, including anti-virus and anti-spyware applications, as well as host-based firewalls. The anti-malware tools safeguard persistent state on the PC, while firewalls cleanse network input. To provide protection, these tools rely on rules and signatures developed based on knowledge of malware, attacks, and software vulnerabilities. While these techniques do not offer perfect protection, they represent the primary defense mechanism for millions of computer users.

Unfortunately, even with these protection mechanisms in place, most computers remain vulnerable to zero-day attacks based on undiscovered vulnerabilities or unknown malware. Further, it appears that zero-day attacks are likely to be a fact of life for years to come. Recent trends indicate that zero-day exploits are on the rise. As new technologies are deployed to defend against known vulnerabilities, the incentive to launch zero-day exploits will increase. As a result, future computer systems must be able to deal with, or at least recover from, zero-day attacks.

Zero-day attacks fundamentally undermine a user's confidence in the security of her machine, since they can seize control of applications and even the operating system and then use this control to disable or subvert protection software. This subversion can be subtle and thus difficult to detect. For example, it may leave the protection software running but prevent it from downloading updates needed to detect and remove the infection. By keeping a low profile, malware may remain undetected indefinitely, and throughout this time the user is unwittingly vulnerable to arbitrary malicious activity. For instance, her bank passwords may be captured, or her computer may be used to send spam or launch denial-of-service attacks.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Briefly described, the subject disclosure pertains to securing anti-virus software so that it becomes tamperproof without requiring hardening of an underlying operating system. More specifically, the disclosure concerns utilizing virtualization to isolate anti-virus software, among other things. Anti-virus software operates in a secure virtual machine environment while user applications (e.g., e-mail clients, web browsers, word processors, video games, etc.) and the primary user operating system run in a guest virtual machine environment. The anti-virus software in the secure environment inspects the state of the guest or user environment at the file system level to detect malware components.

In accordance with an aspect of the disclosure, a guest initiated logging system is provided. The system includes an append-only log file in the secure environment that retains entries relating to file system operations in the guest environment. File system operations are intercepted before proceeding and forwarded to the secure virtual machine for inclusion in the append-only log file. Anti-virus software monitors the log file to detect malware signatures. After logging, the file system operation commences. Accordingly, known and unknown malware of a certain type cannot write to disk and execute without leaving a persistent record.

According to another aspect of the disclosure, a split file system mechanism is provided. The file system employed by the guest environment is moved to the secure environment, leaving only a stub interface. The guest environment utilizes the stub interface to access the file system. File system commands are communicated across the virtual machine boundary from the guest environment to the secure environment, where anti-virus software can observe all file system operations.

In accordance with yet another aspect of the subject disclosure, a method is provided for detecting patient malware components. Certain types of malware reside in memory and only write to disk upon imminent shutdown. A fake shutdown can occur on a forked virtual machine to fool patient malware to make itself known to anti-virus software monitoring from a secure environment.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION OF ILLUSTRATIVE EMBODIMENTS

Figure 1:
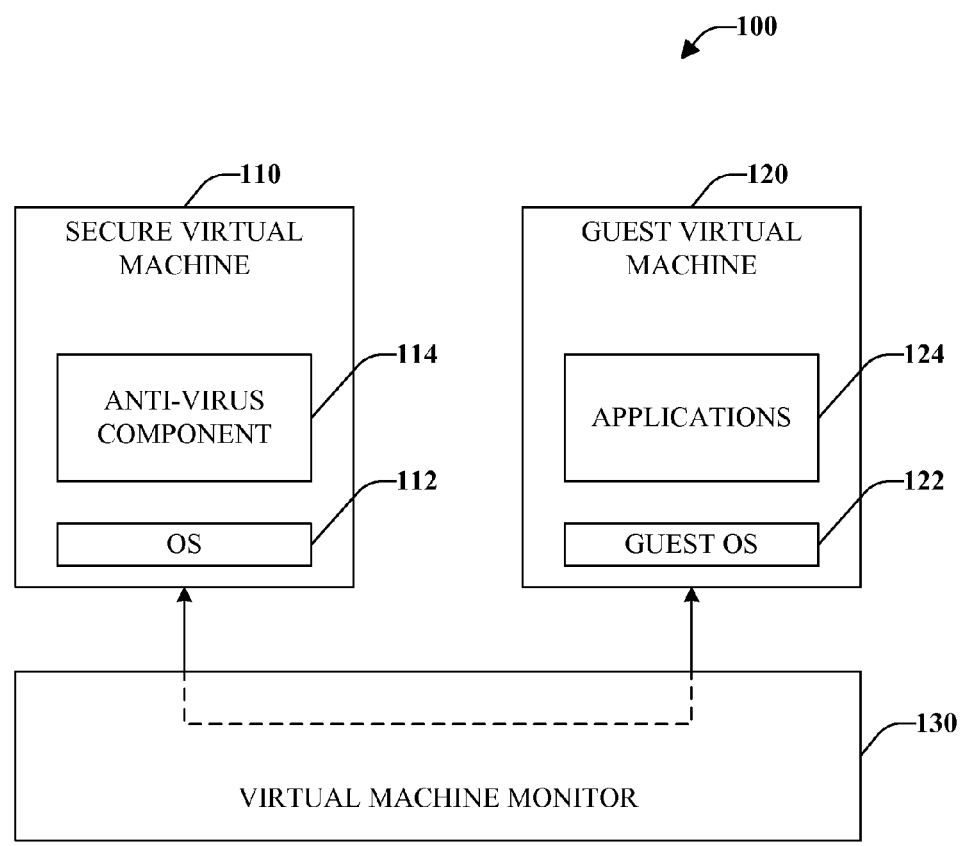
FIG. 1 illustrates a block diagram of a secured anti-virus system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring initially to FIG. 1, a secured anti-virus system 100 is depicted in accordance with an aspect of the claimed subject matter. Anti-virus systems attempt to detect and eliminate computer viruses or other malicious software (collectively referred to herein as malware) from a user environment. To provide protection from malware, an anti-virus system relies on rules and/or signatures developed based on knowledge of malware, attacks, software vulnerabilities and the like. Malware analysts or anti-virus system developers typically develop the rules and signatures that are distributed to anti-virus systems to enable detection of new malware. Prior to development of the latest signatures, user systems remain vulnerable to zero-day attacks or exploits (i.e., newly released malware). Newly released malware can subvert anti-virus systems and prevent the systems from receiving new signatures that enable detection of the malware, all the while maintaining the appearance that the system is properly functioning. Accordingly, the malware may remain undetected indefinitely and malicious activity can continue to occur.

System 100 facilitates preserving the integrity of the anti-virus system through virtualization. System 100 includes a secure virtual machine 110 and a guest virtual machine 120. Within each virtual machine, operating systems 112 and 122 respectively run on virtual machines 110 and 120 as they normally would on a physical machine. Operating systems 112 and 122 may be unaware of the virtualization altogether. It is to be appreciated that operating systems 112 and 122 can be any type of operating system. For example, in accordance with one aspect, the operating systems can be commodity systems commonly employed by end users. System 100 further includes a virtual machine monitor 130. Virtual machine monitor 130 is a thin layer that can run directly on the hardware of a physical machine and presents the abstraction of multiple virtual machines such as virtual machines 110 and 120. Virtual machine monitor 130 has direct access to physical machine hardware and can monitor and/or control hardware access of supported virtual machines.

A key property of virtualization is isolation. Isolation provides that applications and operating systems inside one virtual machine cannot see or affect another VM (and applications and system therein) unless explicitly permitted to do so. For example, virtual machine monitor 130 can allow virtual machine 110 to view the condition of virtual machine 120 by enabling hardware introspection, communicating virtual machine events, forwarding virtual machine commands or the like. Accordingly, the isolation property of virtualization provides a course through which anti-virus components can be protected from zero-day attacks. One use of this protection is to enable the components to retrieve new signature updates to enable detection of newly released malware.

Guest virtual machine 120 includes a user operating system 122 and user applications 124. For example, applications 124 can include e-mail clients, web browsers, office suites, video games and other productivity or recreational applications. Thus, guest virtual machine 120 largely supports all user activity expected in a typical user environment. Secure virtual machine 110 includes operating system 112 and anti-virus component 114. It is to be appreciated that anti-virus component 114 can be a legacy anti-virus system (i.e., not developed in consideration of virtualization) or an anti-virus system designed with virtualization in mind. The virtual machine monitor 130 allows secure virtual machine 110 to monitor and control guest virtual machine 120. However, virtual machine monitor 130 does not permit the reverse. Thus, malware that takes control of the guest virtual machine cannot disrupt the operation of protection software such as anti-virus component 114. Further, the secured operation of anti-virus component 114 enables protection of the guest virtual machine 120 from known malware and past zero-day attacks (e.g., newly released malware for which updated signatures have been distributed) even when zero-day malware attempts to subvert protection software.

One approach to employing virtualization techniques in anti-virus systems takes advantage of virtual machine introspection to enable one virtual machine to monitor another. In particular, in the virtual machine introspection technique, a virtual machine monitor allows one virtual machine to examine the hardware state of an inspected virtual machine. The hardware state can relate to the virtualized hardware state of the virtual machine. The virtual machine monitor can report hardware events of the inspected virtual machine to the inspecting virtual machine. For example, the inspecting virtual machine registers a callback that is invoked when certain hardware events occur on the inspected virtual machine. Alternatively, the virtual machine monitor can allow the inspecting virtual machine to query the hardware state of the other virtual machine.

Under this approach, a secure virtual machine can be notified whenever a guest virtual machine writes to disk. As a virtual machine monitor only provides accurate information about the low-level hardware state of the guest virtual machine, the secure virtual machines must infer behavior of the software within the guest virtual machine. The virtual machine monitor provides information at the block level (e.g., information related to blocks written to disk) to the secure virtual machine. The secured virtual machine then infers information about file writes based upon the block level information. Unfortunately, this approach suffers from the following problem. If malware has successfully gained control of the guest virtual machine, it may violate certain assumptions used by the secure virtual machine to make inferences. Thus, information gleaned by introspection of a compromised guest virtual machine is unreliable and may not allow the security software to properly protect the guest virtual machine. Accordingly, the ensure the fidelity of information received from the guest virtual machine and needed by the secure virtual machine, system 100 operates at the file system level. System 100 considers file system events and operations instead of events at the hardware or block level. The anti-virus virtualization approaches at the file system level are described infra with reference to FIGS. 2-4.

Malware can follow various paths and techniques to compromise a computer system. One way to classify malware is based on its interaction with the disk. There are two main classes of malware, disk-based malware and memory-based malware. Disk-based malware must be written to disk before it can execute. This class of disk-based malware includes viruses typically spread via e-mail or infected files. This form of malware often relies on social engineering techniques to persuade users to execute the malware. The MyDoom virus is an example of disk-based malware. Anti-virus systems are typically most effective against disk-based malware. If the anti-virus system retains an appropriate signature for the malware it can prevent files containing that malware from executing. However, anti-virus systems compromised by zero-day malware may not be able to prevent such execution even while retaining the signature.

A second type of malware, memory-based malware, can execute without being written to disk. Often, memory-based malware exploits software vulnerabilities (e.g., a buffer overflow, format string vulnerability, etc.) to load into memory and commence execution. Worm viruses such as the Blaster and SQL Slammer worms are examples of memory-based malware. Memory-based malware can be further classified into one of two subclasses. One subclass includes pure memory-based malware that never writes any data to disk. The second subclass includes mixed memory-based malware that does write data to disk. Memory-based malware authors have various reasons for writing to disk. The first is convenience. Rather than write new tools that avoid disk writes, they may use pre-existing tools, such as an ftp client, that write to disk. Second, malware authors may need to download large amounts of data that will not fit in main memory. For example, if the malware is to serve as a repository for bootleg movies or pirated software, it may need to store them on disk. Third, and most importantly, malware authors often want their malware to maintain control of the system beyond a shutdown. Pure memory-based malware is purged from the system upon shutdown as it resides solely in volatile memory; this provides a strong motivation to write to disk. Generally, anti-virus systems do not protect against memory-based exploits. However, systems may be able to detect mixed memory-based malware when the malware writes to disk. Nonetheless, mixed memory-based malware is already executing and, with the proper privileges and capabilities, can disrupt the normal operation of anti-virus systems.

Figure 2:
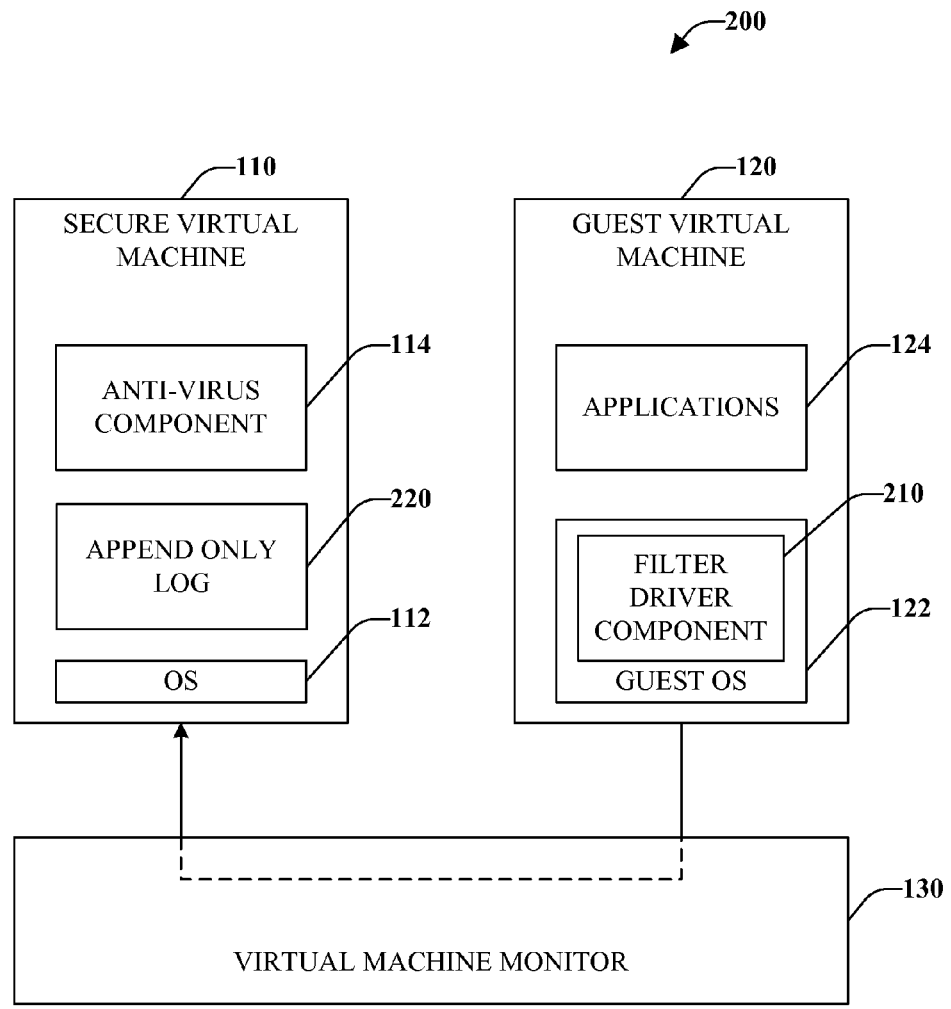
FIG. 2 illustrates a block diagram of a secured anti-virus system employing guest initiated logging.

Turning now to FIG. 2, illustrated is a secured anti-virus system 200 employing virtualization and guest initiated logging (GIL). The GIL approach allows anti-virus software to detect malware even if the malware is initially unknown and, thus, has the opportunity to execute. System 200 includes a virtual machine monitor 130 supporting two virtual machines, a secured virtual machine 110 and a guest virtual machine 120. Guest virtual machine 120 includes user applications 124 and guest operating system 122. Guest operating system 122 further includes a filter driver component 210. Secured virtual machine 110 includes anti-virus component 114, operating system 112 and an append-only log 220.

Guest initiated logging system 200 employs append-only log 220 to monitor file system operations of guest virtual machine 120. A write operation in the guest virtual machine 120 must be logged to an append-only log 220 in the secure virtual machine 110 before the write operation is allowed to proceed. In this way, disk-based malware is invariably written to disk before it can execute and attain control over a system. At the time of writing to disk, the malware does not have any control over the guest yet, and so cannot prevent the guest from logging the malware. Once the write operation is logged in the append-only log 220, the presence of the malware is essentially permanent. Thus, even with zero-day malware, the malware is logged and, upon the distribution of a matching signature, is detected by anti-virus component 114 based upon the corresponding write entry in append-only log 220.

Filter driver component 210 facilitates providing secure virtual machine 110 with file system operations to log in append-only log 220. Filter driver component 210 can be associated with a file-system driver of guest operating system 122. Filter driver component 210 intercepts relevant file system operations. Not all file system operations may be relevant. For example, filter driver component 210 can be configured to only log write operations and not read operations. Further, filter driver component 210 can consider other file system operations that query or set attributes irrelevant. Filter driver component 210 invokes a command in virtual machine monitor 130 when a relevant file system operation occurs. The virtual machine monitor adds a log entry to append-only log 220 in the secure virtual machine 110. The append-only property of log 220 prevents guest operating system 122, if compromised, from editing or deleting log entries. The log entries are persistent. Malware can remove all incriminating evidence from guest virtual machine 120 but anti-virus component 114 can still detect the malware's presence based upon the log entries.

In accordance with one aspect of the subject disclosure, filter driver component 210 intercepts create, open, write and close operations. Create and open operations can be logged but this is not necessary. These commands can be intercepted so that an open handle associated with a file can be retained for future use. When a write operation is intercepted, the write is logged. The log entry can include bytes written, write location, and the like. When a close operation is intercepted, the close may or may not be logged depending on whether there has been a write operation to the handle associated with the close.

In secure virtual machine 110, anti-virus component 114 monitors the log 220 in real time. Real time monitoring enables anti-virus component 114 to detect known malware. After anti-virus component 114 receives an update or a new set of signatures from a developer or malware analyst, anti-virus component 114 can rescan the log 220 to detect malware unknown at the time it was written and logged. In addition, anti-virus component 114 can utilize a standard log format of append-only log 220 to scan in situ.

According to yet another aspect, users may adjust the amount of disk space allocated to or consumed by append-only log 220. However, adjusting log disk space involves balancing or trading off between space efficiency and ease of detection and recovery. For example, on one end of the continuum, system 200 can be configured such that append-only log 220 only stores entries of operations that have occurred since the boot time. Anti-virus component 114 is, therefore, limited to determining if guest virtual machine 120 is currently infected or has been infected since the last boot. In this situation, zero-day malware may go undetected if infection occurred prior to a reboot and the appropriate signatures were acquired after the reboot. Alternatively, on the other end of the continuum, system 200 can be configured to record extensive log entries to append-only log 220 such that it contains a complete history. In this situation, anti-virus component 114 can employ append-only log 220 to determine if guest virtual machine 120 has ever been infected. In addition, system 200 can be configured to a middle point. For example, system 200 can log file system operations occurring in the last five boot cycles.

Regardless of the level of recording, append-only log 220 may be limited to a finite size. When the limit is reached, log entries wrap around (i.e., new entries overwrite old entries). Malware, attempting to exploit a size limit of append-only log 220, can write large mounts of data to disk. The frequent write operations could potentially result in the log entry indicating the presence of the malware being overwritten. Anti-virus component 114 employs anomaly detection to counter this technique. A wrap around should occur infrequently and a large increase in the rate and amount of data written can be an indication of intrusion. Anti-virus component 114 can inform a user of this potential intrusion while noting that the active writing may be the result of user activity (e.g., creating movies, downloading pictures, etc.).

Figure 3:
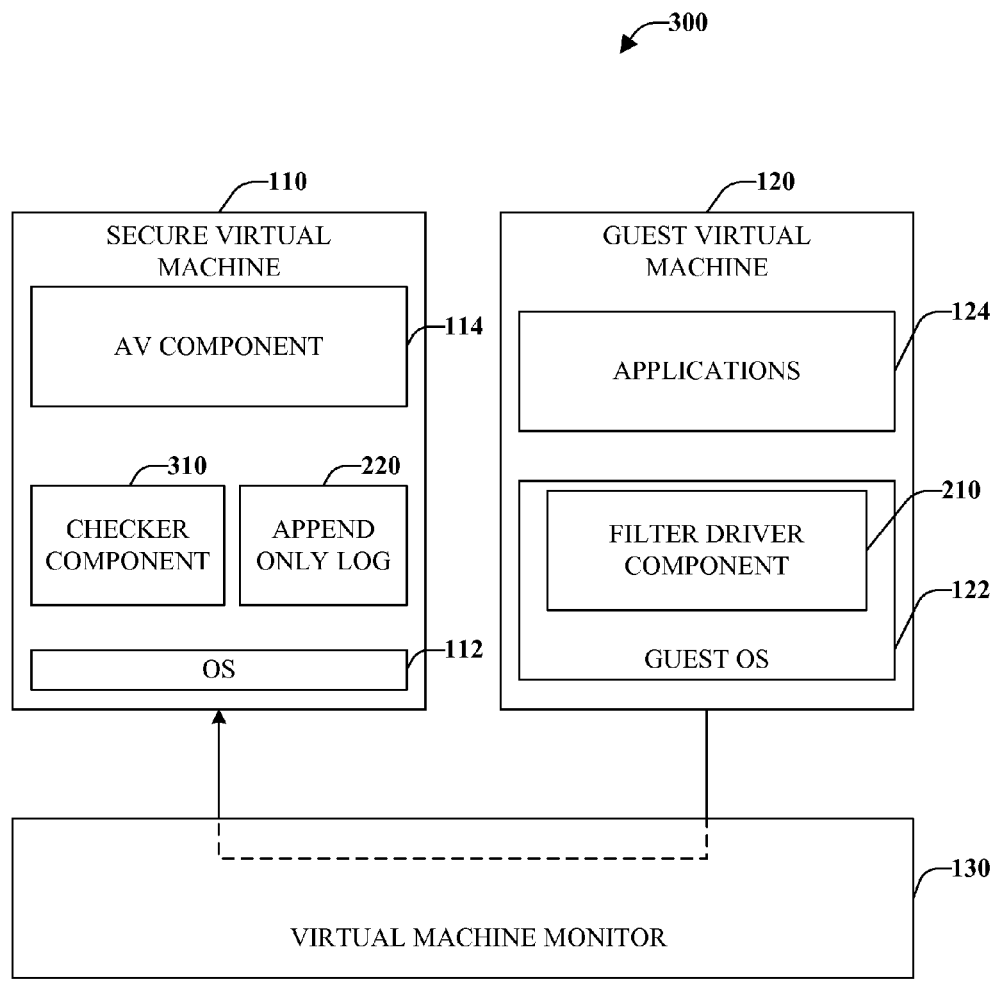
FIG. 3 illustrates a block diagram of a guest initiated logging system according to one aspect of the subject disclosure.

Referring to FIG. 3, a guest initiated logging system 300 is depicted in accordance with another aspect of the subject disclosure. GIL system 300 is similar to system 200 described with reference to FIG. 2. System 300 facilitates detecting memory-based malware and, particularly, mixed memory based malware. Secure virtual machine 110 further includes a checker component 310 in addition to anti-virus component 114, operating system 112 and append-only log 220 as described supra. Checker component 310 periodically checks the disk and/or file system for consistency. By checking or verifying consistency, it becomes possible to detect memory-based malware in guest virtual machine 120 that attempts to halt or subvert guest-initiated logging. Thus, checker component 310 can detect mixed memory-based malware that attempts to compromise logging and the normal logging operation will detect mixed memory-based malware that does not attempt such actions.

Checker component 310 periodically retains a snapshot of a virtual disk or file system of guest virtual machine 120. For example, checker component 310 utilizes copy-on-write disks to efficiently generate snapshots. After taking the snapshot, checker component 310 verifies whether the snapshot is consistent with the sequence of file system operations logged in append-only log 220 between the newest snapshot and the previous snapshot retained. For example, checker component 310 can create a virtual disk from the previous snapshot and replay the logged operations since that snapshot to produce a resultant state of the virtual disk. The resultant virtual disk is compared to the most recent snapshot at the file system level. Inconsistency can suggest intrusion by memory-based malware that interred with guest-initiated logging.

Figure 4:
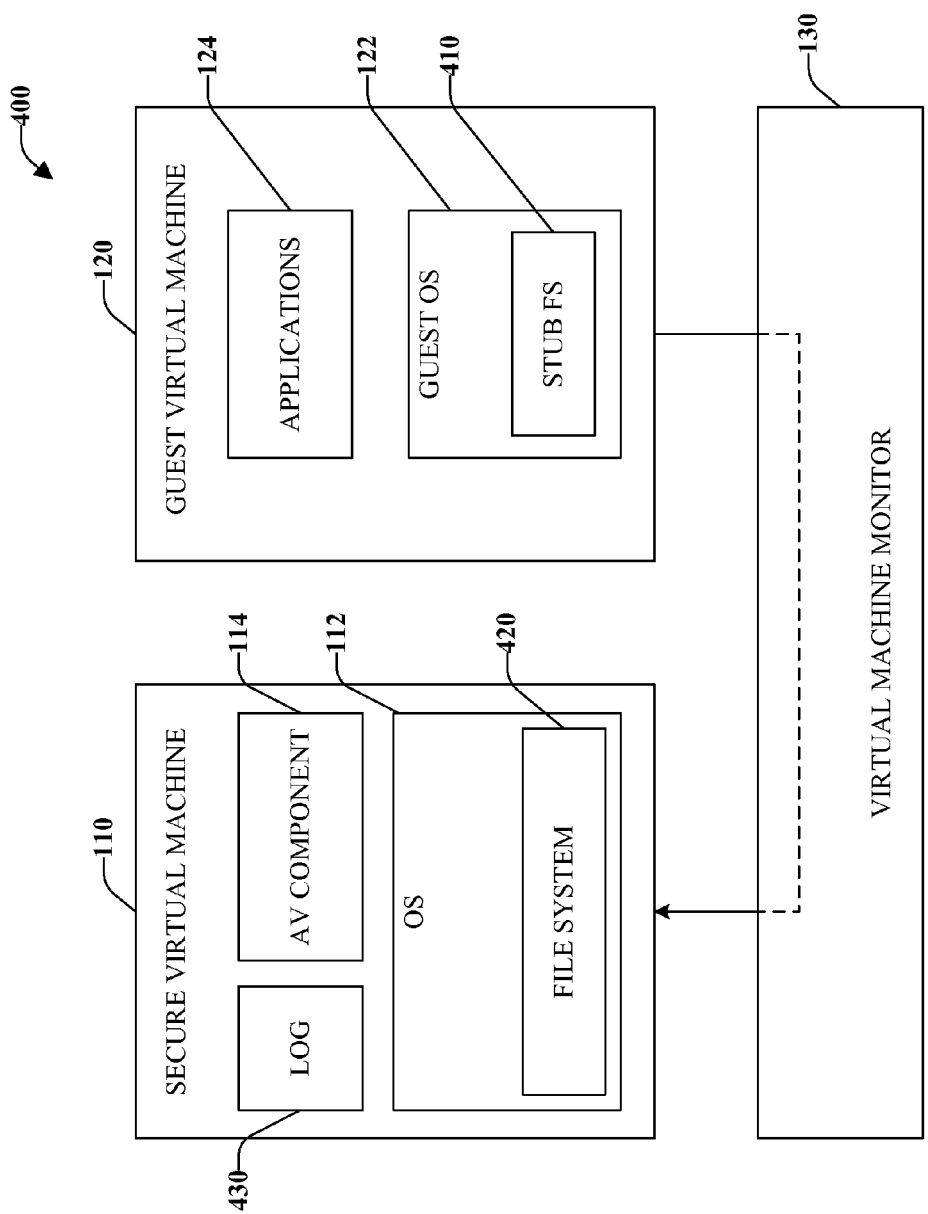
FIG. 4 illustrates a block diagram of a secured anti-virus system utilizing a split file system.

Turning now to FIG. 4, illustrated is a secured anti-virus system 400 utilizing a split file system. System 400 protects guest virtual machine 120 against disk-based malware and mixed memory-based malware. System 400 employing a split file system guarantees anti-virus component 114 observes every file system operation of guest virtual machine 120 with perfect fidelity. Secure virtual machine 110 includes file system 420 that is employed by guest virtual machine 120 and guest operating system 112. Thus, guest virtual machine 120 does not have direct access to file system 420 or to the disk. Rather, guest virtual machine 120 includes a stub interface 410. Stub interface 410 communicates with file system 420 running in secure virtual machine 110. Stub interface 410 defines a set of commands file system 420 recognizes and facilitates guest operating system 112 communication with file system 420. Virtual machine monitor 130 passes messages between guest virtual machine 120 (and stub interface 410) and secure virtual machine 110 (and file system 420). This interface between virtual machines 110 and 120 can be hardened or secured to prevent attacks. Secure virtual machine 110 can be configured to anticipate arbitrary input from stub interface 410 resulting from a compromised guest virtual machine. Secure virtual machine 110 includes a log 430 that retains entries related to file system operations performed on file system 420. Log 430 can be similar to append-only log 220 from FIGS. 2 and 3. Further, log 430 facilitates review of file system operations when signature updates become available.

Figure 5:
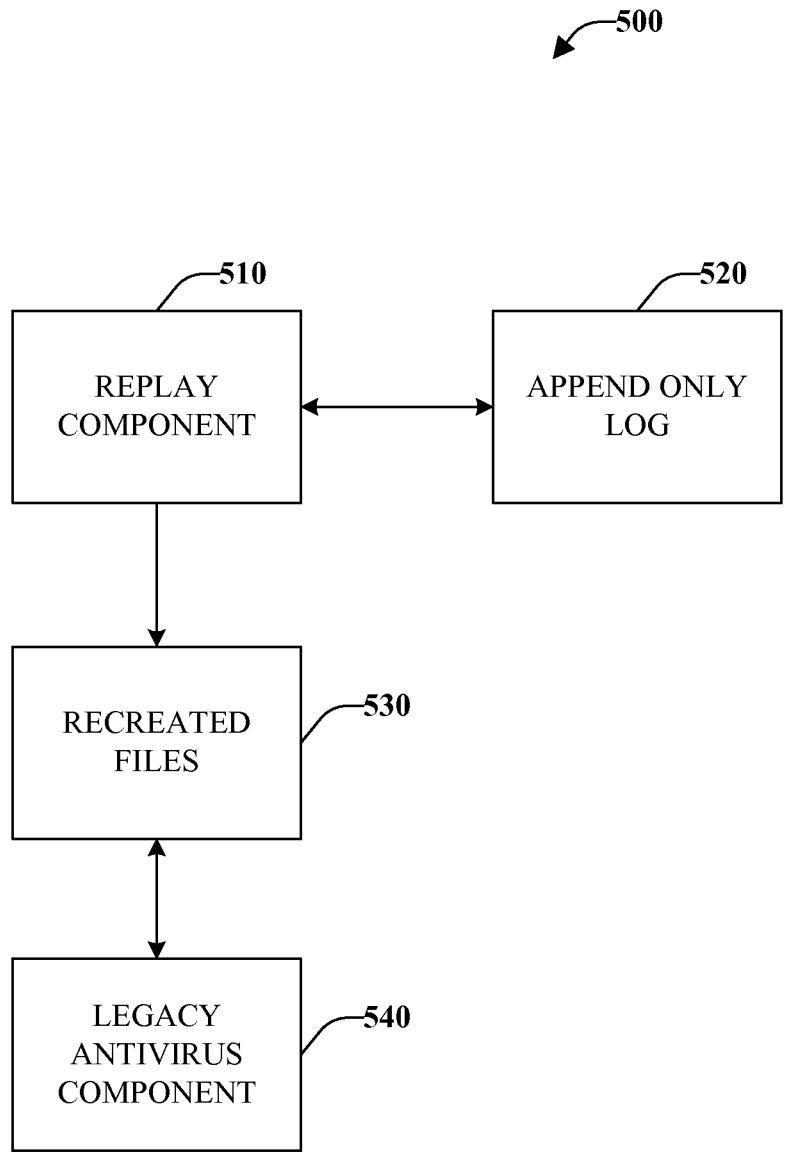
FIG. 5 illustrates a block diagram of a retroactive anti-virus scanning system in accordance with an aspect of the subject disclosure.

Referring briefly to FIG. 5, a retroactive anti-virus scanning system 500 is depicted in accordance with an aspect of the subject disclosure. System 500 facilitates employing legacy anti-virus systems with the virtualization approaches described supra with reference to FIGS. 2-4. System 500 includes a replay component 510 that utilizes append-only log 520 to replay or simulate file system operations logged therein. Append-only log 520 can be similar to append-only log 220 or log 430. Append-only log 520 can included entries relating to create and write operations of a guest virtual machine. Reply component 510 replays the log to generate recreated files 530 similar to those created on the guest virtual machine. Legacy anti-virus component 540 can scan the recreated files employing traditional file-based scanning. Thus, legacy anti-virus software can interoperate with secured anti-virus systems employing virtualization as described in the subject disclosure.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the anti-virus component 114 can employ such mechanism to determine which and/or whether or not to present warnings to a user based upon suspicious activity relating to an append-only file.

Figure 6:
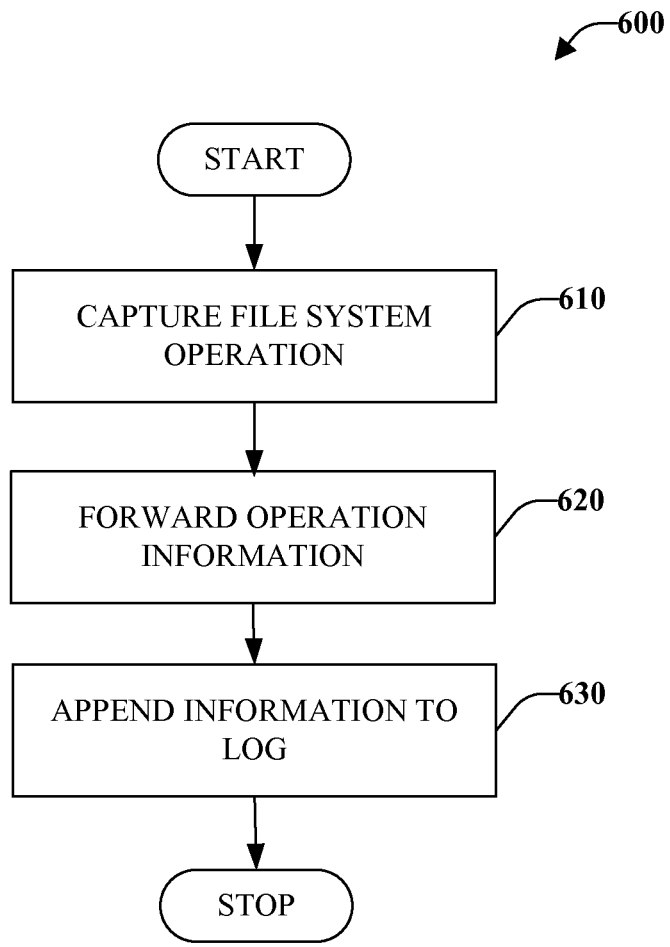
FIG. 6 illustrates a flow chart of a method of virtualized virus protection.
Figure 7:
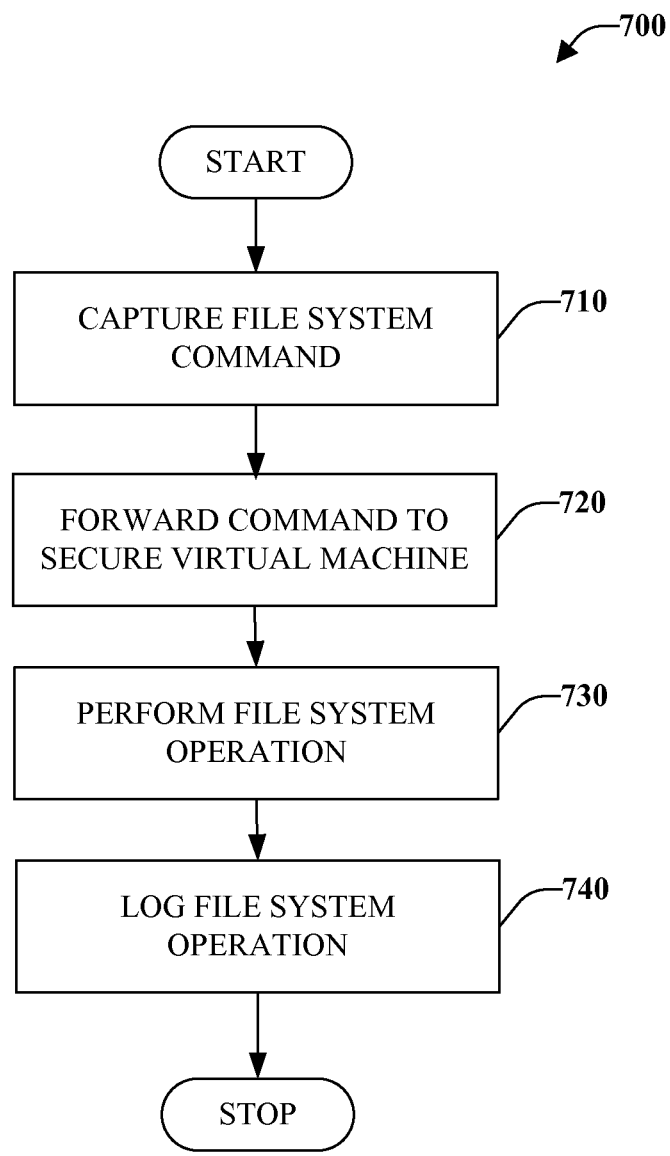
FIG. 7 illustrates a flow chart of a method of virtualized virus protection.
Figure 8:
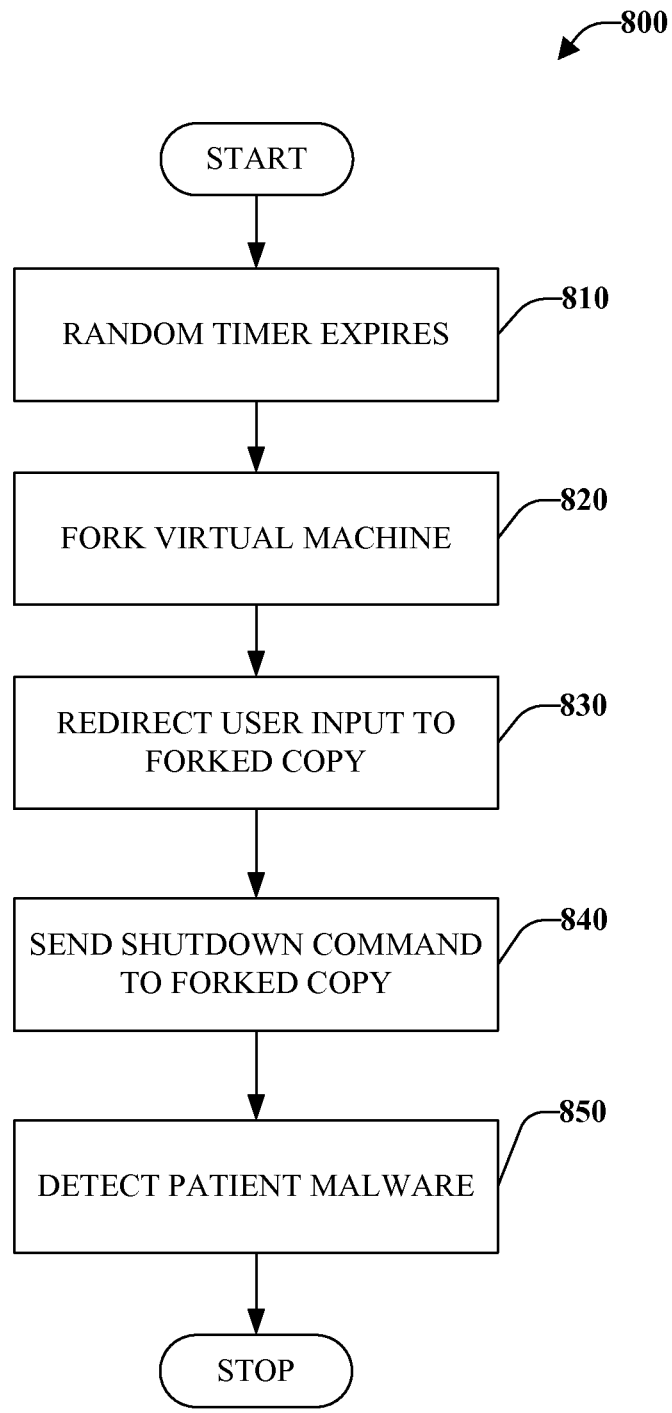
FIG. 8 illustrates a flow chart of a method of fake system shutdowns.

In view of the exemplary systems described supra, methodologies that may be implemented in accordance with the disclosed subject matter will be better appreciated with reference to the flow chart of FIGS. 6-8. For purposes of simplicity of explanation, methodologies that can be implemented in accordance with the disclosed subject matter are shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Referring to FIG. 6, a flow chart diagram is provided that depicts a virus protection method 600 utilizing virtualization techniques in accordance with an aspect of the subject disclosure. Among other things, the virus protection method 600 can be utilized to ensure the integrity of anti-virus system from zero-day attacks and/or malware. At reference numeral 610, file system operations are captured. The file system operations can be performed by a guest virtual machine supporting a user environment including a commodity operating system and user applications (e.g., e-mail, browsers, office suites, etc.). The operations can be captured by a filter that is associated with or layered with a file system driver of the guest operating system. At reference numeral 620, information related to the file system operation is forwarded to a secure virtual machine. The information can include operation type, written data, file system location identifiers, and the like. A monitoring component supporting both the secure virtual machine and the guest virtual machine can convey the information from the guest to the secured virtual machine. In addition, it should be appreciated that the secure virtual machine can be a physical machine located locally or remotely and the information can be forwarded via a network. At reference numeral 630, the file system information is appended to a log stored by the secure virtual machine. The log file can be monitored by anti-virus software to detect malware signatures and/or the log file can be replayed to enable legacy software to scan replicated files.

Turning now to FIG. 7, a flow chart diagram is provided that depicts a virtualized virus protection method 700 according to an aspect of the subject disclosure. Virtualized virus protection method 700 can be employed to detect disk-based malware and memory-based malware, among other things. At reference numeral 710, a file system command is captured. The file system command can be a request and/or operation to be performed on a file system employed by a guest operating system running in a guest virtual machine. At reference numeral 720, the file system command issued by the guest virtual machine is forwarded or passed to a secure virtual machine. The secure virtual machine includes the file system employed by the guest virtual machine as well as an anti-virus component. At reference numeral 730, a file system operation associated with the forwarded file system command is performed on the file system retained by the secure file system. At reference numeral 740, the performed operation is logged. Logging the operation enables future replay or review to detect malware intrusions after an update or new signature release.

Referring now to FIG. 8, a flow chart diagram is provided that depicts a method 800 for performing fake system shutdown. Among other things, method 800 may be employed to detect patient malware that could otherwise remain undetected. Known disk-based malware and mixed memory-based malware can be quickly detected by the systems and methods described herein when the malware writes to disk. An intelligent piece of malware that is memory-based (i.e., enters via a memory exploit such as a buffer overflow) can avoid detection for an extended period by delaying any use of the disk. Malware that has compromised a computer by a memory-based exploit will not persist across a system shutdown unless it is written to disk. Patient malware can wait to write to disk until it detects that a shutdown is imminent. Accordingly, patient malware can persist in memory for a long period as shutdowns are time-consuming and disruptive and, accordingly, infrequently invoked. Method 800 facilitates detecting patient malware while avoiding costs associated with frequent shutdowns.

At reference numeral 810, a pseudo-random timer expires. The timer triggers a fake shutdown procedure. The timer expires randomly to prevent malware from inferring a fake shutdown schedule and thereby avoiding detection by foregoing writing to disk when the imminent shutdown is likely to be fake. At reference numeral 820, the guest virtual machine running a guest operating system is forked. A fork involves duplicating or copying a running virtual machine such that two identical versions exist. At reference numeral 830, all user input is redirected to the original virtual machine. Thus, from the user perspective, no change has occurred. The redirection can be controlled by a virtual machine monitor supporting the guest virtual machine and its copy. At reference numeral 840, the copied guest virtual machine is sent a shutdown command. The shutdown command notifies patient malware that a shutdown is imminent. At reference numeral 850, any malware writing to disk is detected prior to the shutdown of the forked copy.

The fake shutdown on the forked virtual machine is indistinguishable from a real shutdown. The guest operating system on the guest virtual machine can be modified such that it only shuts down upon receiving a particular hardware signal. A user wishing to shutdown may invoke a key sequence (e.g., Control-Alt-Delete). The key sequence is captured by a virtual machine monitor supporting the guest virtual machine and never reaches the guest virtual machine. The virtual machine monitor handles any warnings needing to be conveyed to the user, such as a warning that shutting down the machine will discard unsaved data. The virtual machine monitor, upon confirmation from the user, sends the appropriate hardware signal to shutdown the guest virtual machine. Accordingly, at reference numeral 840, when the virtual machine monitor sends the same type of hardware signal to the forked virtual machine to initiate a fake shutdown, it will be indistinguishable from a real shutdown.

Figure 9:
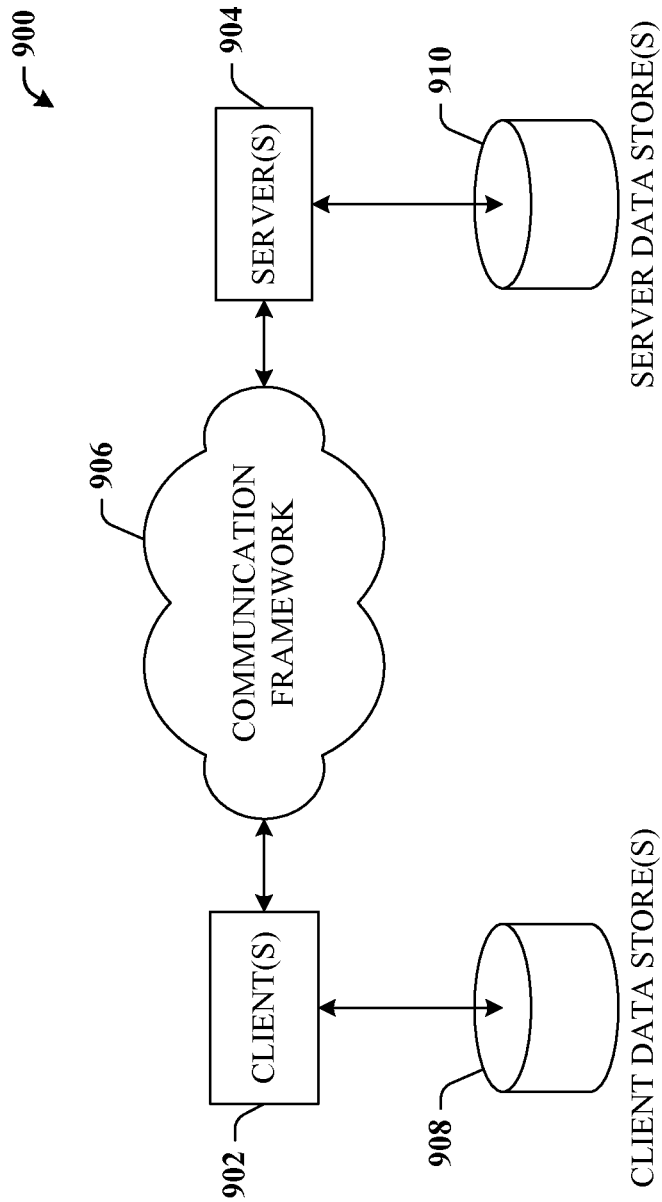
FIG. 9 illustrates a schematic block diagram of a sample computing environment.
Figure 10:
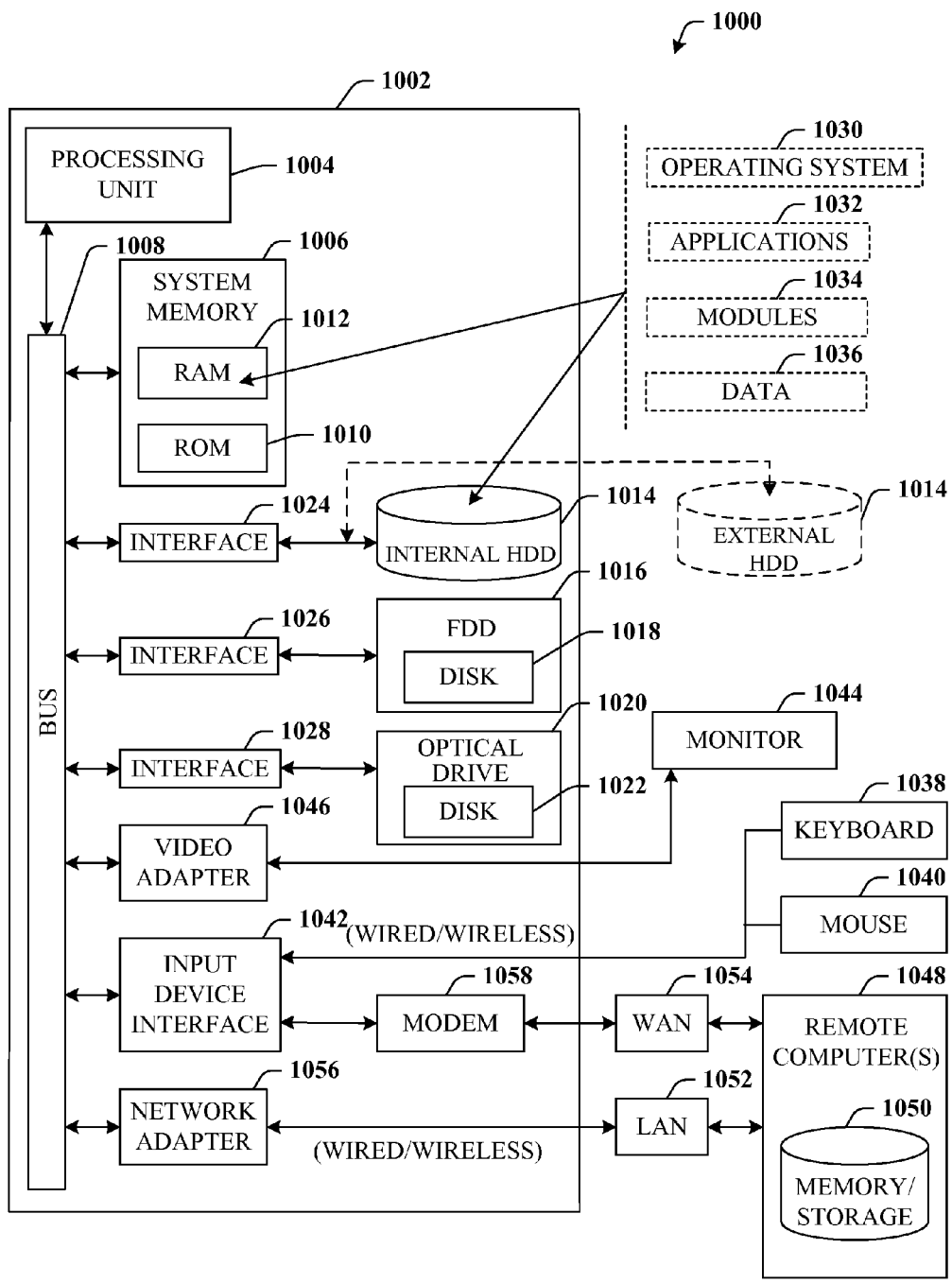
FIG. 10 illustrates a schematic block diagram of a suitable operating environment for aspects of the subject disclosure.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide realworld performance similar to the basic 10 BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed:

1. An anti-virus system, comprising:
a memory having stored thereon instructions that when executed on the system cause the system to:
operate a first virtual machine configured to execute a user environment; and
operate a second virtual machine configured to:
execute an anti-virus scanning component on the second virtual machine;
copying the first virtual machine upon an expiration of a timer while the first virtual machine is operating, to create an operating forked copy of the first virtual machine;
initiate a shutdown procedure of a forked copy of the first virtual machine; and
detect a disk writing operation of a malware component in response to the initiation of the shutdown procedure, wherein the shutdown procedure of the operating forked copy of the first virtual machine is indistinguishable from a shutdown procedure of the first virtual machine.

2. The system of claim 1, wherein the second virtual machine comprises a log file that retains file system operations associated with the first virtual machine.

3. The system of claim 2, wherein the second virtual machine comprises a file system employed by the user environment in the first virtual machine and the first virtual machine comprises an interface to the file system, and wherein the log file retains a write operation to the file system received from the first virtual machine through the interface.

4. The system of claim 2, wherein the file system operations comprise malware disk write operations.

5. The system of claim 2, wherein the log file is an append-only file configured to prevent edits by a compromised user environment of the first virtual machine.

6. The system of claim 2, wherein the anti-virus scanning component monitors the log file in real time to detect a malicious activity.

7. The system of claim 1, further comprising a timer that causes the second virtual machine to fork the first virtual machine upon an expiration of the timer.

8. The system of claim 1, wherein the second virtual machine is further configured to redirect user input to an original copy of the first virtual machine.

9. A computer-readable storage device having stored thereon instructions that when executed cause a system to:
instantiate a first virtual machine;
execute a random timer;
instantiate a copy of the first virtual machine upon an expiration of the random timer while the first virtual machine is still instantiated, wherein the copy resulted from a second virtual machine copying the first virtual machine;
initiate a shutdown procedure of the instantiated copy of the virtual machine;
execute an anti-virus scanning component on the second virtual machine; and
detect a disk write operation of a malware based on the initiation of the shutdown procedure, wherein the shutdown procedure of the instantiated copy of the first virtual machine is indistinguishable from a shutdown procedure of the first virtual machine.

10. The computer-readable storage device of claim 9 further comprising instructions that when executed cause the system to:
detect a malware write operation to disk;
log the write operation in a persistent file; and
scan the persistent file to detect a malicious activity.

11. The computer-readable storage device of claim 9, wherein the instructions to initiate the shutdown procedure further comprise instructions that when executed cause the system to:
generate a warning message;
transmit the warning message to a user interface;
receive an acknowledgment message from the user interface to proceed with the shutdown procedure; and
cause the malware component to write to disk in response to the received acknowledgment message.

12. The computer-readable storage device of claim 9, further comprising instructions that when executed cause the system to redirect user input associated with the virtual machine to an original copy of the virtual machine.

13. A method for detecting a malware component running on a virtual machine, comprising:
copying a first virtual machine by a second virtual machine while the virtual machine is operating, to create an operating forked copy of the first virtual machine;
initiating a shutdown procedure of the forked copy of the first virtual machine upon an expiration of a timer;
execute an anti-virus scanning component on the second virtual machine; and
detecting a disk writing operation of a malware component during the initiated shutdown procedure, wherein the shutdown procedure of the operating forked copy of the first virtual machine is indistinguishable from a shutdown procedure of the first virtual machine.

14. The method of claim 13, further comprising redirecting user input to an original copy of the virtual machine.

15. The method of claim 14, wherein the redirecting is handled by a virtual machine monitor running the virtual machine.

16. The method of claim 13, wherein forking the virtual machine comprises instantiating a copy of the virtual machine in response to an expiration of a timer.

17. The method of claim 16, wherein the initiated shutdown procedure is based on receiving a trigger by a host in response to the expiration of the random timer.

18. The method of claim 17 further comprising the host generating a warning message in response to the trigger.

19. The method of claim 18 further comprising the host transmitting the warning message to a user interface associated with a user environment of the virtual machine and initiating the shutdown procedure to the forked copy in response to receiving data from the user interface authorizing the shutdown command.

20. The method of claim 13 further comprising causing the malware component to write to disk based on the shutdown procedure.

\* \* \* \* \*